United States Patent [19]
Karmel

[11] Patent Number: 6,111,541
[45] Date of Patent: *Aug. 29, 2000

[54] POSITIONING SYSTEM USING PACKET RADIO TO PROVIDE DIFFERENTIAL GLOBAL POSITIONING SATELLITE CORRECTIONS AND INFORMATION RELATIVE TO A POSITION

[75] Inventor: Clayton R. Karmel, San Jose, Calif.

[73] Assignees: Sony Corporation, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/936,720

[22] Filed: Sep. 24, 1997

Related U.S. Application Data

[60] Provisional application No. 60/046,020, May 9, 1997.

[51] Int. Cl.$^7$ .............................. H04B 7/185; G01C 21/00
[52] U.S. Cl. ....................................... 342/357.13; 701/213
[58] Field of Search ................................. 342/357, 357.1, 342/357.13; 701/213

[56] References Cited

U.S. PATENT DOCUMENTS

| | | | |
|---|---|---|---|
| 4,970,523 | 11/1990 | Braisted et al. | 342/418 |
| 5,119,504 | 6/1992 | Durboraw, III | 455/54.1 |

(List continued on next page.)

OTHER PUBLICATIONS

Trimble Navigation Limited, "CrossCheck AMPS Cellular," Feb. 1998, USA.
Trimble Navigation Limited, "NavMariner," Jan. 1998, USA.
Trimble Navigation Limited, "ACE GPS Module," Jul. 1997, USA.
Trimble Navigation Limited, "GPS/Cellular Messenger," Feb. 1997, USA.
Trimble Navigation Limited, "FleetVision for Windows," Nov. 1996, USA.
Trimble Navigation Limited, "Trimble Introduces New Line of Wireless Communications Products," Feb. 1, 1995, USA.
Trimble Navigation Limited, "Why GPS?" printed on Feb. 18, 1998, copyright 1996, 1997, from Trimble's internet web site located at http://www.trimble.com.

(List continued on next page.)

*Primary Examiner*—Mark Hellner
*Attorney, Agent, or Firm*—Haverstock & Owens LLP

[57] ABSTRACT

A positioning system includes the ability to receive GPS signals and to receive and transmit packet radio signals. The positioning system receives GPS transmissions to determine its pseudo position. The positioning system also receives differential corrections relative to its pseudo position using packet radio. By combining the GPS transmissions and the differential corrections, the positioning system calculates its actual position. A user has the ability to obtain information relevant to their actual position by transmitting a request to a reference station, using packet radio. The reference station maintains an information system and will transmit the requested information back to the user. The information system includes a data storage memory and retrieval system and a direct link to the internet. The user is able to provide information for storage within the information system or on the internet in order to compile the information available from the reference station. The positioning system also includes the ability to automatically transmit its position periodically allowing the reference station to track and monitor its actual position. Information relative to its location, signals and alerts are transmitted to predetermined locations based on the position of the positioning system relative to a predetermined location or another positioning system. Alternatively, the positioning system determines its position using only packet radio. Reference stations at known locations transmit signals having predetermined amplitudes and signal strengths. A positioning system determines its position relative to the reference stations based on the amplitude and strength of the signals received from the reference stations.

33 Claims, 3 Drawing Sheets

6,111,541

U.S. PATENT DOCUMENTS

| Patent No. | Date | Inventor | Class |
|---|---|---|---|
| 5,208,756 | 5/1993 | Song | 364/449 |
| 5,268,695 | 12/1993 | Dentinger et al. | 342/357 |
| 5,323,322 | 6/1994 | Mueller et al. | 364/449 |
| 5,327,144 | 7/1994 | Stilp et al. | 342/387 |
| 5,361,212 | 11/1994 | Class et al. | 364/428 |
| 5,428,358 | 6/1995 | Gardner | 342/26 |
| 5,477,228 | 12/1995 | Tiwari et al. | 342/357 |
| 5,477,458 | 12/1995 | Loomis | 364/449 |
| 5,510,798 | 4/1996 | Bauer | 342/357 |
| 5,523,763 | 6/1996 | Loomis | 342/357 |
| 5,544,225 | 8/1996 | Kennedy, III et al. | 379/59 |
| 5,559,520 | 9/1996 | Barzegar et al. | 342/357 |
| 5,568,152 | 10/1996 | Janky et al. | 342/357 |
| 5,579,376 | 11/1996 | Kennedy, III et al. | 379/60 |
| 5,608,410 | 3/1997 | Stilp et al. | 342/387 |
| 5,627,547 | 5/1997 | Ramaswamy et al. | 342/357 |
| 5,663,734 | 9/1997 | Krasner | 342/357 |
| 5,675,524 | 10/1997 | Bernard | 364/705.05 |
| 5,680,140 | 10/1997 | Loomis | 342/357 |
| 5,694,322 | 12/1997 | Westerlage et al. | 364/464.27 |
| 5,699,275 | 12/1997 | Beasley et al. | 364/514 R |
| 5,714,948 | 2/1998 | Farmakis et al. | 340/961 |
| 5,719,771 | 2/1998 | Buck et al. | 364/443 |
| 5,802,492 | 9/1998 | DeLorme et al. | 701/200 |
| 5,815,538 | 9/1998 | Grell et al. | 375/356 |
| 5,938,721 | 8/1999 | Dussell et al. | 701/211 |
| 5,946,687 | 8/1999 | Gehani et al. | 707/10 |
| 5,959,577 | 9/1999 | Fan et al. | 342/357.13 |
| 5,987,381 | 11/1999 | Oshizawa | 701/209 |

OTHER PUBLICATIONS

Trimble Navigation Limited, "Searching Trimble Navigation—differential gps," printed on Feb. 19, 1998, from Trimble's internet web site located at http://www.trimble.com/cgi/AT–Web_Sitesearch.cgi.

David Fowler, "Starlink Incorporated—The Starlink DGPS Pages," Aug. 9, 1995.

Peter H. Dana, "An Overview of the Global Positioning System (GPS)," Sep. 9, 1995.

POSITIONING SYSTEM USING PACKET RADIO TO PROVIDE DIFFERENTIAL GLOBAL POSITIONING SATELLITE CORRECTIONS AND INFORMATION RELATIVE TO A POSITION

This application claims the benefit of U.S. Provisional Application No. 60/046,020, filed on May 9, 1997.

FIELD OF THE INVENTION

The present invention relates to the field of positioning systems which allow a user to determine their position. More particularly, the present invention relates to the field of differential positioning systems which provide corrections and information to the user relative to their position.

BACKGROUND OF THE INVENTION

The global positioning satellite (GPS) system is used by a user with a GPS receiver to determine their position. The GPS system was designed for and is operated by the U.S. military. The GPS system consists of a number of satellites in approximately 12 hour, inclined orbits of the earth, each of which transmit continuous positional information regarding their position relative to the earth. The orbit altitude of each satellite is such that the satellites repeat the same track and configuration over any point approximately every 24 hours. In actuality, the satellite reaches the same point four minutes earlier each day. There are six orbital planes, each with four satellites, inclined at about fifty-five degrees with respect to the polar plane. This provides a system whereby between five and eight satellites are visible at a given time from any point on the earth.

Two positioning services are provided by the GPS system: the precise positioning service (PPS) which is reserved for military use and the standard positioning service (SPS) which is available for general use. The following description is confined to the SPS although some features are common to both systems. The SPS is intentionally degraded by the U.S. Department of Defense (DOD) to limit accuracy for non-U.S. military and government users. The selective availability (SA) bias on each satellite signal is different. The resulting position solution is therefore a function of the combined SA bias from each satellite used to determine a position. By measuring the propagation time of these transmissions and hence the distance from three satellites to a user's position, an accurate calculation can be made of the user's position in three dimensions. To make a valid positional fix, the propagation times of the transmissions must be measured to an accuracy of better than 100 ns and then these times must be facilitated to the satellite signals which each have timing marks at approximately 1 $\mu$s intervals. However, each satellite's signals are synchronized to an atomic clock, the accuracy of which is not maintained by the normal user of the system. As a result, the user's clock is said to be in error (in other words, different from the time kept by the satellite) by a clock bias $C_B$. By measuring the apparent satellite signal propagation times from four satellites rather than three, the redundancy can be used to solve for the clock bias $C_B$ of the user's system and the three accurate propagation times required to determine position can be calculated. The signal propagation times correspond to ranges of the user from the satellites related by the speed of light c. Prior to correction for the user's clock bias $C_B$, the apparent ranges of the satellites are all in error by a fixed amount and are called pseudoranges.

The data transmitted by each satellite includes three sets of information, the ephemeris, the almanac and the clock correction parameters. The ephemeris includes detailed information about the satellite's own course over the next two hours, the almanac consists of less detailed information about the complete satellite constellation for a longer period and the clock correction parameters allow the user to correct for the GPS satellite's own clock errors. The satellite transmissions consist of a direct sequence spread spectrum (DSSS) signal containing the ephemeris, almanac, and the clock correction information at a rate of 50 bits per second (bps). In the case of the SPS, a pseudo random noise (PRN) signal which has a chip rate of 1.023 Mhz and which is unique to each satellite is used to spread the spectrum of the information, which is then transmitted on a center frequency of 1575.42 MHz. The PRN signal is known as a course/acquisition (C/A) code since it provides the timing marks required for fast acquisition of GPS signals and course navigation. The C/A code repeats every 1023 bits or one millisecond.

The GPS satellite signals received at a user's receiver have a bandwidth of approximately 2 MHz and a signal to noise ratio (S/N) of approximately –20 dB. In addition, since the satellites are each moving at a speed in excess of 3 km/s, the GPS signals are received with a Doppler frequency offset from the GPS center frequency. As a result, a stationary GPS receiver has to be capable of receiving signals with frequencies within a 4 KHz range from the GPS center frequency, and a mobile receiver (as is usually the case) has to be able to receive signals over an even greater range. To recover the data and measure the propagation time of the satellite signals, the GPS receiver must cancel or allow for the Doppler frequency offset and generate the C/A code relevant to each satellite. Initially, at least, this task can be very time consuming since to despread the DSSS signals, the incoming and locally generated code must be synchronized. To find the code delay, the receiver must compare the locally generated code and the incoming code at a number of different positions until the point of synchronism or correlation is found. With a code length of 1023 bits this comparison can be a lengthy procedure. However, once the frequency offset and the PRN code delay for each satellite are known, tracking them is relatively easy.

If pinpoint accuracy is required, a differential GPS technique can be used. Differential GPS can be used to more accurately identify a user's position by making propagation time measurements for a mobile receiver and for a fixed receiver at a known location, using the difference to more accurately determine the position of a mobile receiver. A fixed reference station GPS receiver, which knows exactly the position of its antenna and the ranges from its antenna to each satellite, is used to provide corrections to remote GPS receivers. The reference station GPS receiver measures the ranges to each satellite using the received signals just as if it were going to calculate position. Range errors are then calculated by subtracting the measured ranges from the known ranges. These range errors are then transmitted by the reference station as differential corrections to remote users. The remote users using differential GPS will receive both the GPS signals from the satellites and the differential corrections from the reference station. The remote user can then use the differential correction to correct errors in the received signals and more accurately calculate its position.

A basic GPS receiver and a differential GPS receiver can both only provide positional data through the satellite transmissions and corrections received by the GPS receiver. Using these transmissions the GPS receiver can calculate a user's position in three dimensions. However, neither the basic GPS system or the differentially corrected GPS system is capable of giving the user any information relative to or about their position. GPS receivers of the prior art also do not include a transmitter for transmitting information.

A positional system designed and maintained by Irimble Navigation, Inc. provides information relative to a user's position. A user with a GPS receiver uses the receiver to first determine their position. Once their position is determined, the user's receiver system, using a cellular phone, calls a dedicated number and is circuit-switched to the server. The user can then obtain information about their position and the surrounding area, from the server. Due to the high airtime charges, this system is very expensive to use.

What is needed is a positional system which inexpensively provides information about and relative to a user's position efficiently.

SUMMARY OF THE INVENTION

A positioning system includes the ability to receive GPS signals and to receive and transmit packet radio signals. The positioning system receives GPS transmissions in order to determine its pseudo position. The positioning system also receives differential corrections relative to its pseudo position using packet radio. By combining the GPS transmissions and the differential corrections, the positioning system calculates its actual position. A user of the positioning system also has the ability to obtain information relevant to their actual position by transmitting a request, using packet radio, to a reference station. The reference station maintains an information system and will transmit the requested information back to the user about their position. The information system includes a data storage memory and retrieval system and a direct link to the internet for obtaining information in response to a user's request. The user is able to provide information for storage within the information system or on the internet in order to compile the information available from the reference station. The positioning system also includes the ability to automatically transmit its position periodically allowing the reference station to track and monitor its actual position. Information relative to its location, signals and alerts are transmitted to predetermined locations based on the position of the positioning system relative to a predetermined location or another positioning system. A location of persons, animals and property is tracked and monitored using the positioning system.

Alternatively, the positioning system determines its position using only packet radio. Reference stations at known locations transmit signals having predetermined amplitudes and signal strengths. A positioning system determines its position relative to the reference stations based on the amplitude and strength of the signals received from the reference stations.

DETAILED DESCRIPTION OF THE PREFERRED EMBODIMENT

Positioning System Using GPS

The preferred embodiment of the positioning system of the present invention includes a transceiver which is capable of receiving GPS signals from satellites in its view and also receiving and transmitting packet radio signals. The packet radio signals are received from a local reference station and provide differential corrections to the positioning system relative to the GPS transmissions. From the GPS signals and the differential corrections, the positioning system determines its actual position. Once the positioning system has determined its actual position, relevant information about this position is obtained by two-way communication between the positioning system and the reference station using packet radio signals. This relevant information includes locations of interest within the area, services available, directions on how to get to a certain point, distance to a certain point, weather information, traffic information, and the like. The relevant information is retrieved by the reference station from an information system to which it is coupled. The information system includes a data storage and retrieval system and a direct connection to the internet.

The positioning system uses a packet radio network to communicate with the reference station. A packet radio network is a wide-area network in which communication between nodes is accomplished using radio frequencies. Typically, packet radio operates from the high frequency range (1–30 MHz) to the extra-high frequency range (3–10 GHz). Using packet radio, multiple positioning systems are able to communicate with a single reference station. The preferred embodiment of the present invention uses the Cellular Digital Packet Data (CDPD) format for communication between the positioning systems and a reference station. CDPD has been chosen because of its direct connection to the internet. Alternatively, narrowband PCS (NPCS) or any alternate format of packet radio is used for communication between the positioning system and the reference station.

Positioning System Using GPS With User Interface

Figure 1:
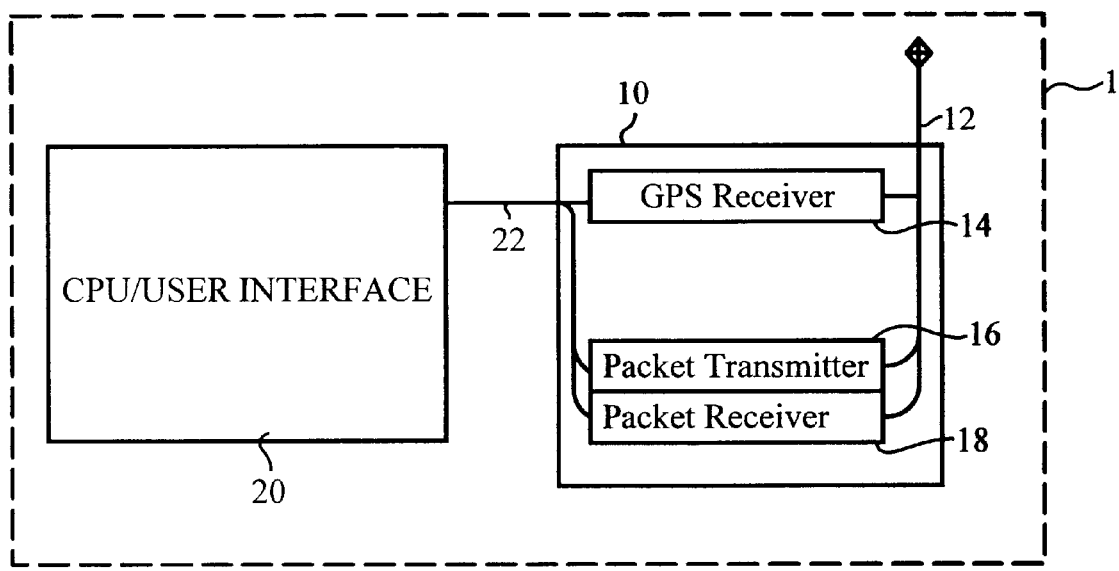
FIG. 1 illustrates a block diagram of the positioning system of the present invention.

A block diagram of the positioning system of the present invention is illustrated in FIG. 1. The positioning system 1 includes a communications module 10 and a CPU/User Interface 20. The communications module 10 includes an antenna 12, a GPS receiver 14, a packet radio transmitter 16 and a packet radio receiver 18. The GPS receiver 14, the packet radio transmitter 16 and the packet radio receiver 18 are all coupled to the antenna 12. Each of the GPS receiver 14, the packet radio transmitter 16 and the packet radio receiver 18 are coupled to the CPU/User Interface 20 through the cable 22. The CPU/User Interface 20 includes an output device for providing information to the user and an input device allowing the user to input information. In the preferred embodiment of the present invention, the CPU/User Interface 20 is a handheld portable information device, such as the "Sony MagicLink." Alternatively, the CPU/User Interface 20 could be a portable computer or other portable device including the capability to communicate with a reference station through the communications module 10 and provide an interface to the user. The CPU/User Interface 20 of the present invention could also be embodied in a personal computer or similar device mounted in a vehicle.

Figure 2:
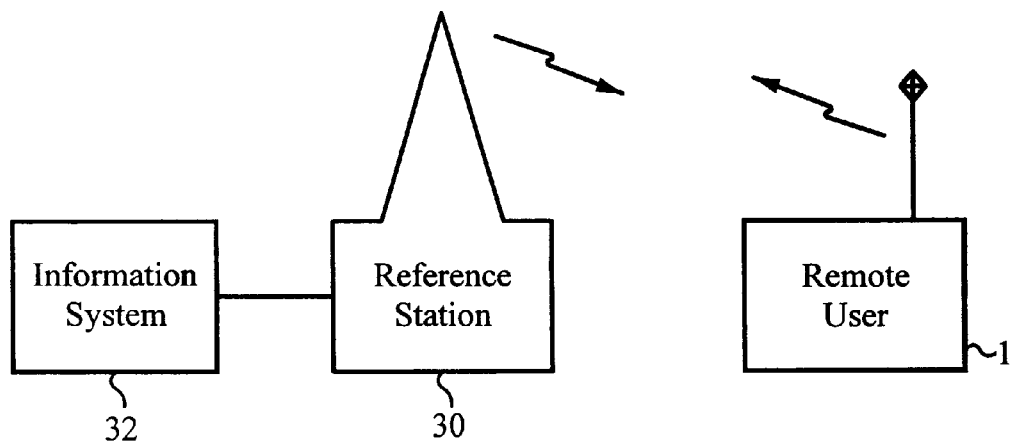
FIG. 2 illustrates a diagram of the overall system of the present invention.

A diagram of the overall system of the present invention is illustrated in FIG. 2. A remote user using a positioning system 1 communicates with a reference station 30 using packet radio. The reference station 30 is coupled to an information system 32 which provides data and information relevant to the remote user's position. The reference station 30 is positioned in a strategic regional location to provide a maximum range of communication to multiple positioning systems 1. In densely populated areas, multiple reference stations 30 are used to provide coverage to an area. In the preferred embodiment of the overall system of the present invention, reference stations 30 are positioned in a vicinity with cellular telephone transmission stations.

In order to calculate its position, the positioning system 1 of the present invention first determines its pseudo position using the GPS receiver 14 and the received transmissions from the satellites in its view. Once the positioning system 1 determines its pseudo position, this position is transmitted to the reference station 30, using the packet transmitter 16. The reference station 30 then obtains updated differential corrections from the information system 32 relative to this pseudo position. These differential corrections are transmitted from the reference station 30 to the positioning system 1 and received by the packet receiver 18. When the positioning system 1 receives the differential corrections from the reference station 30 relating to its pseudo position, it can then determine its actual position using the GPS transmissions and the differential corrections.

The differential corrections obtained from the information system 32 are range errors and other corrections to the GPS transmissions. The differential corrections obtained from the information system 32 also include characteristics about the pseudo position known by the reference station 30 and allowances that should be taken into account for these characteristics. For example, if the pseudo position is located within a densely populated metropolitan area, then the differential corrections obtained from the information system 32 will include predetermined values accounting for shadowing or reflections which are common in that area that should be included within the actual position calculations of the positioning system 1. If the pseudo position is located on the high plains in a flat, open area, then such predetermined values and calculations might not be necessary.

The communications module 10 has to time sequence the packet radio signal transmission and reception activities with the GPS reception signal activities in order to avoid the effects of collision and interference between the GPS and packet radio signals. Because the GPS signals are transmitted at predetermined intervals, the packet radio signals are time sequenced to be sent and received between the times when the communications module 10 will receive the GPS signals. The positioning system 1 accordingly listens to a predetermined number of GPS transmissions from the satellites in its view. Once the positioning system 1 has synchronized itself to the GPS transmissions it then can transmit and receive packet radio signals to and from the reference station 30 between the GPS transmissions. The positioning system 1 will therefore have to suspend communications with the reference station 30 when it is receiving a GPS transmission. When the GPS transmission is complete, the positioning system 1 resumes its communications with the reference station 30.

Once the positioning system 1 of the present invention has determined its actual position, the user is then able to obtain relevant data about this position from the reference station 30. In order to obtain the relevant data the user will enter a request for information which is transmitted to the reference station 30. This request for information includes the actual position of the positioning system 1. The reference station 30 will process the user's request, obtaining the necessary information from the information system 32, and transmit the information back to the positioning system 1. The information is then output to the user through the output device of the user interface 20.

The information provided to the positioning system 1 about the actual position, can be anything related to that position. Such information includes what is available in the area in regards to specific requests such as services, shopping, restaurants, gas stations, restrooms, hotels, etc. The user also has the ability to obtain distance from and directions to a specific place, either directly or taking into account the current traffic information. The weather forecast for the area around the actual position can also be provided from the reference station 30 to the positioning system 1. If the information system 32 does not have the requested information then the reference station 30 will transmit an "information not available" message back to the positioning system 1.

The user is also able to transmit information about a location to the reference station 30 using the positioning system 1. This information is stored within the information system 32 and later retrieved when information about that location is requested by another user. In this manner, the amount of information stored within the information system 32 is increased or added to by the users of the positioning systems 1. If a user makes a specific request and receives an "information not available" message, then that user, once they determine the necessary information to answer that specific request, is able to transmit the information to the reference station 30 to be stored in the information system 32.

In the preferred embodiment of the present invention, the information system 32 is a self-contained storage memory and data retrieving system which will provide responses to specific inquiries based on key words and other controls. The information system 32 within the preferred embodiment also includes a direct link to the internet, providing a user access to the Internet through the positioning system 1 and the reference station 30. The CDPD packet data network includes a direct link to the internet. Accordingly, if CDPD or another packet data network with such a link is used, the internet can be accessed and used either as the information system 32 or in conjunction with a self-contained storage memory and data retrieving system. If another format is used for communication, the reference station 30 could provide a link to allow the positioning system to access the internet. In the preferred embodiment of the present invention, the user is able to obtain data from the reference station 30 directly and through a direct access connection to the internet.

Through the connection to the internet a user is able to obtain data relevant to their position by searching on the internet in a known manner using any available search engine. This data could be organized by zip code or another zone division. In this alternative scheme, the user could also add information to the information already available about a position or zone on a home-page to which they have write-access.

As described above, the system of the present invention facilitates the entry of data into the information system 32 by users, through a positioning system 1. In an alternate embodiment of the present invention, each positioning system 1, in communication with a reference station 30, will be used as a virtual GPS reference station to obtain the differential corrections and other data about the position of the positioning system 1. A fundamental assumption to the successful operation of this scheme is that one or more of the positioning systems 1 in communication with the reference station 30 is stationary at any one time providing a fixed reference point, and known by the reference station 30 to be stationary, long enough to determine a virtual permanent stationary location. The reference station 30 then accumulates the data from the positioning systems 1, which it is in communication with. From this data the reference station 30 generates differential corrections which are transmitted to the positioning systems 1 to aid in calculations of the actual position of each positioning system 1. In this manner, the multiple positioning systems 1 which are in communication with a reference station 30 are used to obtain information necessary for generating the differential corrections to the GPS transmissions.

A general description and general implementations of the positioning system 1 of the present invention have so far been described wherein a user has the ability to both obtain their position and to obtain relevant information about their position from a strategically located regional reference station 30. The positioning system 1 of the present invention is also capable of a more specialized implementation for communication with a specially located reference station providing specialized data about the user's position. Such a specialized system could be implemented for a golf-course whereby each group of golfers is provided with a positioning system 1 of the present invention for communication with a reference station 30 which is centrally located for communicating with positioning systems 1 over the entire golf course. These positioning systems 1 would determine their position, as described above, using GPS transmissions to determine their pseudo position and differential corrections to determine their actual position. Once the actual position of the positioning system 1 is determined, the reference station 30 will then provide information to the user about their location relative to the hole that they are playing, distance to the hole, wind conditions if they hit the ball towards the hole and recommended golf club to use for this distance and conditions.

The communication link between the golfer's positioning system 1 and the reference station 30, will also allow communications between the golfer and the clubhouse. This allows someone at the clubhouse to communicate with the golfer for delivering messages or other information to the golfer. It also allows the golfer to communicate with someone at the clubhouse for requesting information or services.

Another such specialized implementation would allow a positioning system 1 of the present invention to be used as a traveling directory for a self-guided tour of a certain area, such as a shopping mall or historical area. Once the positioning system 1 had determined its actual position, the user could be provided with information about their location or directions to another location, allowing the user to tour the area at their own pace. This implementation would also allow the user to make specialized requests for information to the reference station 30. For example, a user could ask for directions to the nearest water fountain. The reference station, using the user's actual position, would then provide the appropriate directions to the user, through the positioning system 1, to the nearest water fountain.

Positioning System Using GPS Without User Interface

Figure 3:
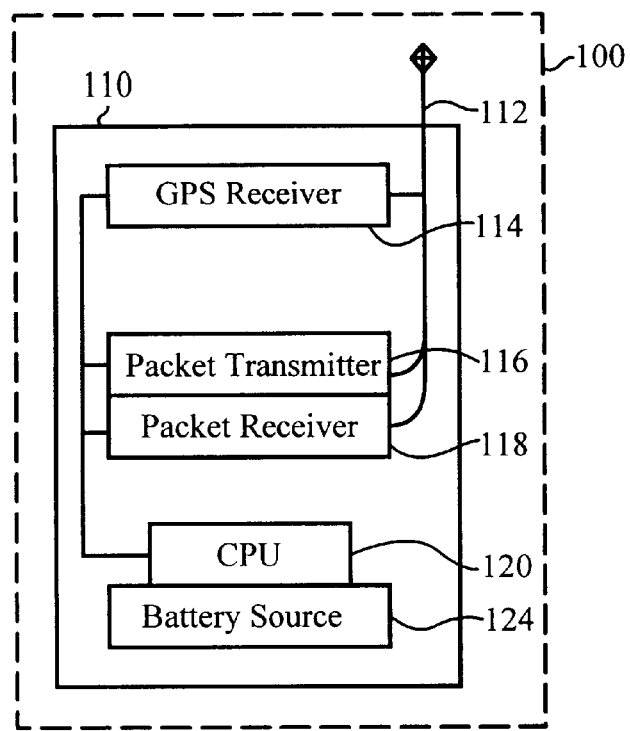
FIG. 3 illustrates a block diagram of a positioning system without a user interface used for tracking the movement of the positioning system.

A block diagram of an alternate embodiment of the positioning system of the present invention is illustrated in FIG. 3. This positioning system 100 includes only a communications module 110 and integral CPU 120, without a user interface. The communications module 110 includes a GPS receiver 114, a packet radio transmitter 116 and a packet radio receiver 118, all coupled to the integral CPU 120 and to the antenna 112. A battery source 124 is also coupled to the CPU 120. The battery source 124 is either a conventional bank of batteries or a solar cell for applications in which the solar cell will be exposed to sunlight.

The positioning system 100 is used to automatically and periodically provide its position to a reference station 30, allowing the reference station 30 to monitor and track the movements of the positioning system 100. The positioning system 100 determines its position as described above by first calculating its pseudo position, using the GPS signals received from the satellites in its view, and using differential corrections provided from the reference station 30 by packet radio to calculate its actual position. The positioning system 100 then periodically transmits its actual position along with a unique code to the reference station 30. Each positioning system 100 will have its own unique code. The reference station 30 then monitors and tracks the movement of each positioning system 100 by its unique code.

Alternatively, the communications module 110 is implemented without the packet radio receiver 116. In this alternate embodiment, the positioning system 100 determines its pseudo position using the GPS signals received from the satellites in its view. The positioning system 100 then transmits its pseudo position and its unique code to the reference station 30. The reference station 30 will then determine the actual position of the positioning system 100 by performing the actual position calculations using the pseudo position and the appropriate differential corrections.

In use, the positioning system 100 can then be attached to or worn by children or other persons to monitor their movement or locate them in the event that they are lost. The positioning system 100 can also be attached to personal property, such as automobiles, or animals, also either for monitoring their movement or locating them. Such a system could be used to monitor the migratory patterns of certain animals or to keep track of certain endangered species. The positioning system 100 also could be used to locate stolen automobiles or alert the owner of the automobile when it is moved from a predetermined location.

The reference station 30 also includes the capability to monitor and track the position of a positioning system 100 relative to a predetermined location or another positioning system 100. The reference station 30 will track the movement of a positioning system 100 and will send an alert when the positioning system 100 is too close or too far from a predetermined location or other positioning system 100. In this manner, the movement of a child equipped with a positioning system 100 could be tracked relative to a daycare center or school, during the appropriate hours. If the positioning system 100 worn by the child moves more than a predetermined distance away from the daycare center or school, an alert is automatically sent to the daycare center, the child's parents and/or the police. As will be apparent to those skilled in the art, there are numerous other uses for such a tracking and movement monitoring system.

Positioning System Using Packet Radio For Position Determination

Figure 4:
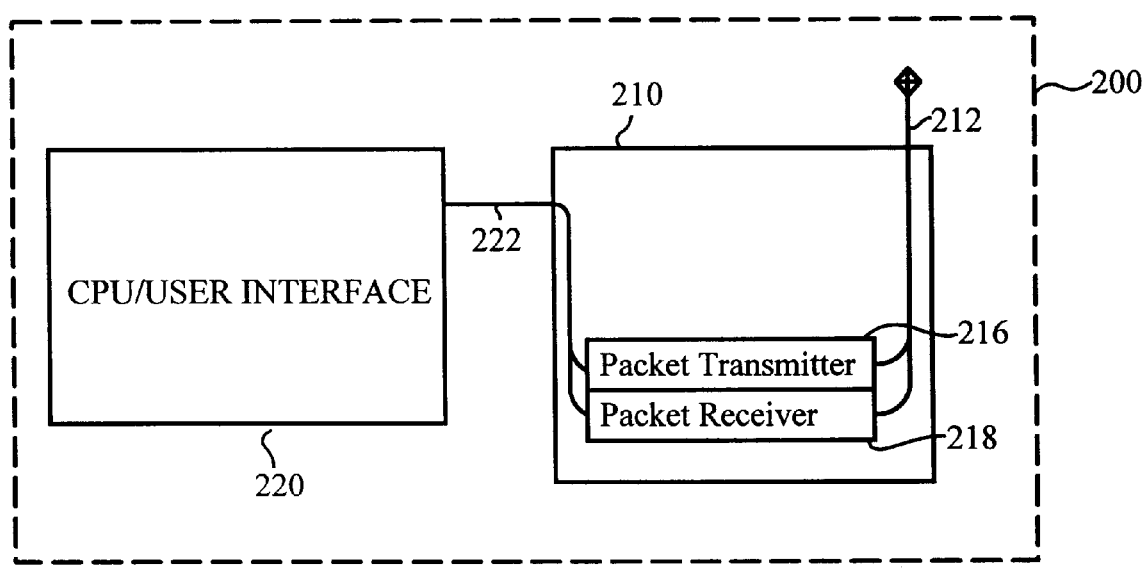
FIG. 4 illustrates a block diagram of an alternate embodiment of the positioning system of the present invention which uses packet radio signals to determine its position.
Figure 5:
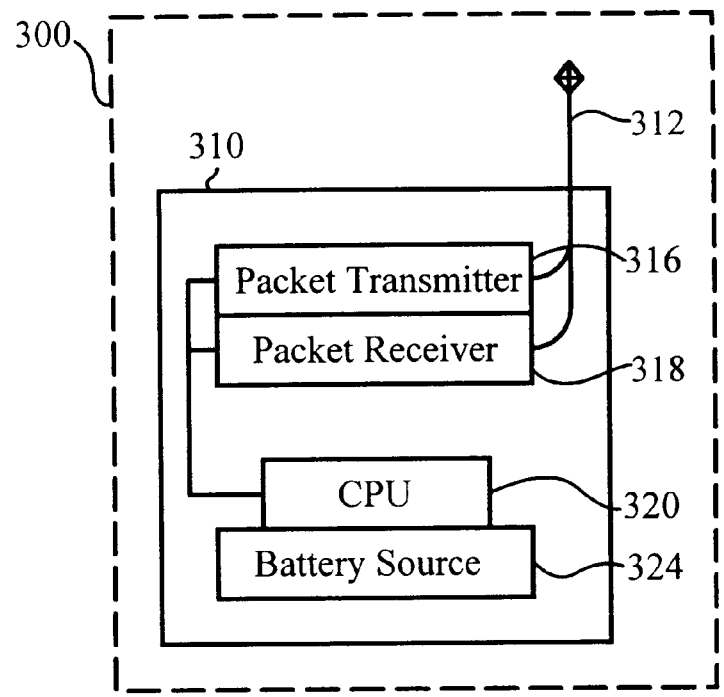
FIG. 5 illustrates a block diagram of a positioning system, without a user interface, which uses packet radio signals to determine its position.

The embodiments of the positioning system of the present invention illustrated in FIGS. 1 and 3 and described above, included GPS receivers and used the GPS transmissions from satellites in their view to determine their position. In alternate embodiments of the positioning system of the present invention, as illustrated in FIGS. 4 and 5, no GPS receiver is included, and the packet radio transmissions from multiple reference stations 30 are used by the positioning system to determine its position. Each reference station 30 transmits a signal of a known amplitude and strength. The positioning system uses the amplitude and strength of the received signal to determine its distance from each reference station 30. By performing this calculation using multiple reference stations 30, the actual position of the positioning system is determined.

A block diagram of a positioning system 200 without a GPS receiver is illustrated in FIG. 4. The positioning system includes a communications module 210 and a CPU/User Interface 220. The communications module 210 includes an antenna 212, a packet radio transmitter 216 and a packet radio receiver 218. The packet radio transmitter 216 and the packet radio receiver 218 are both coupled to the antenna 212. Both the packet radio transmitter 216 and the packet radio receiver 218 are coupled to the CPU/User Interface 220 through the cable 222. The CPU/User Interface 220 includes an output device for providing information to the user and an input device allowing the user to input information.

Figure 6:
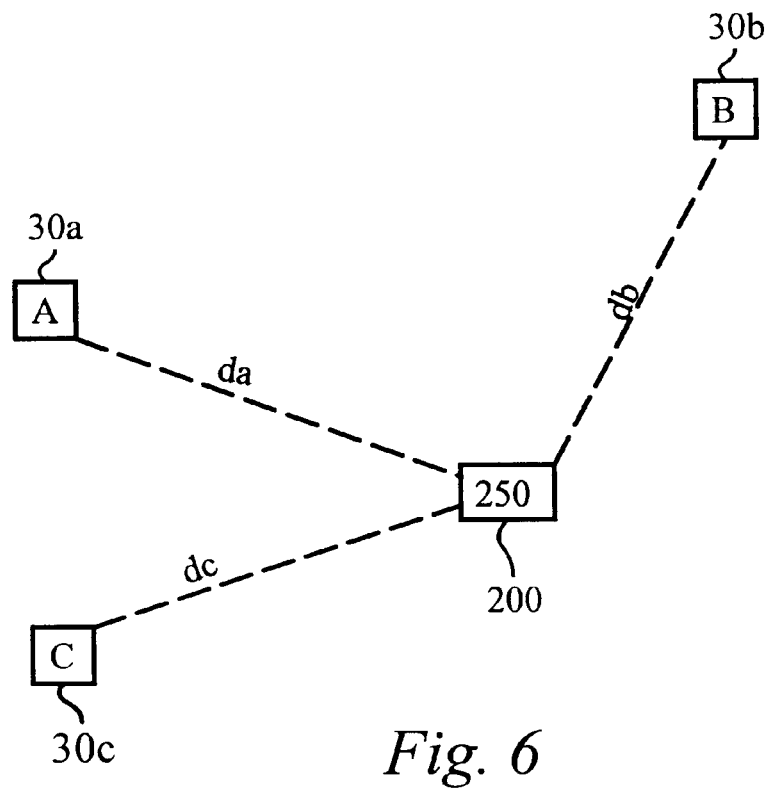
FIG. 6 illustrates a diagram of the overall system of the present invention, including multiple reference stations for determining the position of a positioning system using packet radio signals.

A diagram of the overall system of the present invention, including multiple reference stations for determining position using packet radio, is illustrated in FIG. 6. This overall system includes the reference stations 30a, 30b and 30c located at the positions A, B and C, respectively. The positioning system 200 is located at the position 250 and communicates, using packet radio, to each of the reference stations 30a, 30b and 30c. Each of the reference stations 30a, 30b and 30c transmit signals of a known amplitude and strength. When the positioning system 200 receives a signal transmitted from one of the reference stations 30a, 30b and 30c, the signal has a smaller amplitude and a lesser strength than when it was transmitted. The decrease in the amplitude and strength of the signal is proportionally related to the distance between the reference stations and the positioning system 200. From the decrease in the amplitude and the strength, the positioning system 200 is able to calculate its distance from the reference station.

In order to calculate its position, the positioning system 200 first determines the amplitude and strength of the signal received from the reference station 30a. The positioning system 200 then calculates the decreases in the amplitude and strength of the received signal compared to the known values of the signal transmitted by the reference station 30a. From these decreases, the distance da from the positioning system 200 to the reference station 30a is determined.

The positioning system 200 next determines the amplitude and strength of the signal received from the reference station 30b. The positioning system 200 calculates the decreases in the amplitude and strength of the received signal compared to the known values of the signal transmitted from the reference station 30b. Using these decreases, the distance db from the positioning system 200 to the reference station 30b is determined.

The positioning system 200 next determines the amplitude and strength of the signal received from the reference station 30c. The positioning system 200 calculates the decreases in the amplitude and strength of the received signal compared to the known values of the signal transmitted from the reference station 30c. Using these decreases, the distance dc from the positioning system 200 to the reference station 30c is determined.

Once the distances da, db and dc are determined by the positioning system 200, using the packet radio transmissions received from the reference stations 30a, 30b and 30c, respectively, the positioning system 200 then determines its position 250. After determining its position, the positioning system 200 then can communicate with any or all of the reference stations 30a, 30b and 30c, using packet radio, as described above, to obtain relevant information about its position. Each of the reference stations 30a, 30b and 30c include an information system 32.

A block diagram of a positioning system 300, without a user interface, which uses packet radio signals to determine its position is illustrated in FIG. 5. The positioning system 300 includes only a communications module 310 and integral CPU 320, without a user interface. The communications module 310 includes a packet radio transmitter 316 and a packet radio receiver 318, both coupled to the integral CPU 320 and to the antenna 312. A battery source 324 is also coupled to the CPU 320. As described above, the battery source 324 is either a conventional bank of batteries or a solar cell. The positioning system 300 determines its position, using the packet radio transmissions from multiple reference stations, as described above and illustrated in FIG. 6. Once the positioning system 300 determines its position, it transmits this position to a reference station, which can then track and monitor its motion, as described above.

A positioning system of the present invention determines its position using either GPS or packet radio transmissions. Once its position is determined, the positioning system can then obtain information about the position from a reference station, using a packet radio format. Such a system provides an inexpensive and reliable way to first determine a position and then to obtain relevant information about that position. The reference station can also use the position to locate the positioning system or track its movement relative to a fixed location or another positioning system.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

I claim:

1. A positioning system for determining a position and obtaining information about that position comprising:

a. means for receiving GPS transmissions;

b. means for determining a position coupled to the means for receiving for determining the position of the positioning system based on the GPS transmissions; and c. means for communicating with a reference station, using a packet radio format, coupled to the means for determining, for obtaining non-mapping information related to the position from the reference station and automatically and periodically providing the position to the reference station, wherein the reference station includes means for tracking and monitoring the position of the positioning system and means for sending an alert coupled to the means for tracking and monitoring for sending an alert to a location other than the positioning system if the position of the positioning system is equal to an alert position.

2. The positioning system as claimed in claim 1 wherein the means for receiving includes a GPS receiver capable of receiving GPS transmissions.

3. The positioning system as claimed in claim 2 wherein the means for communicating obtains differential corrections to the GPS transmissions from the reference station for determining an actual position using the GPS transmissions and the differential corrections.

4. The positioning system as claimed in claim 3 further comprising a means for interfacing with a user coupled to the means for communicating for providing an interface to the user and allowing the user to obtain information from the reference station and to provide information to the reference station.

5. The positioning system as claimed in claim 4 wherein the packet radio format is a CDPD format.

6. The positioning system as claimed in claim 1 wherein the reference station includes an information system from which the information is obtained.

7. The positioning system as claimed in claim 6 wherein the information system includes a data storage memory and retrieval system.

8. The positioning system as claimed in claim 7 wherein the information system further includes a direct internet connection allowing the positioning system to have direct access to information on the internet.

9. A positioning system for determining a position comprising:
 a. means for receiving GPS transmissions;
 b. means for determining a position coupled to the means for receiving for determining the position of the positioning system based on the GPS transmissions;
 c. means for tracking and monitoring for monitoring the position of the positioning system; and
 d. means for sending an alert coupled to the means for tracking and monitoring for sending an alert to a location other than the positioning system if the position of the positioning system is equal to an alert position.

10. The positioning system as claimed in claim 9 further comprising a means for communicating with a reference station, using a packet radio format, coupled to the means for determining, for obtaining differential corrections to the GPS transmissions and for obtaining non-mapping and geographical mapping information about the position from the reference station.

11. The positioning system as claimed in claim 10 further comprising a means for interfacing with a user coupled to the means for communicating for providing an interface to the user and allowing the user to obtain information from the reference station and to provide information to the reference station.

12. The positioning system as claimed in claim 11 wherein the packet radio format is a CDPD format.

13. The positioning system as claimed in claim 10 wherein the reference station includes an information system from which the information is obtained.

14. The positioning system as claimed in claim 13 wherein the information system includes a data storage memory and retrieval system.

15. The positioning system as claimed in claim 14 wherein the information system further includes a direct internet connection allowing the positioning system to have direct access to information on the internet.

16. The positioning system as claimed in claim 10 wherein the reference station includes the means for tracking and monitoring and the means for sending an alert.

17. A method of determining a position and obtaining information about the position comprising the steps of:
 a. receiving GPS transmissions;
 b. determining a position of a positioning system based on the GPS transmissions;
 c. communicating with a reference station using a packet radio format to obtain information related to the position from the reference station;
 d. automatically and periodically providing the position to the reference station; and
 e. providing an alert to a location other than the positioning system when the position is equal to an alert position.

18. The method as claimed in claim 17 wherein the step of communicating further includes obtaining differential corrections to the GPS transmissions from the reference station.

19. The method as claimed in claim 18 further comprising the step of determining an actual position using the GPS transmissions and the differential corrections.

20. The method as claimed in claim 19 further comprising the step of providing an interface to a user thereby allowing the user to communicate with the reference station.

21. The method as claimed in claim 17 further comprising the step of monitoring the position.

22. A system for determining a position and obtaining information about that position comprising:
 a. a reference station including:
  i. a first receiver for receiving GPS transmissions;
  ii. a differential calculation circuit coupled to the first receiver for calculating differential corrections from the GPS transmissions and known parameters;
  iii. a first communications circuit coupled to the differential calculation circuit for sending and receiving communications in a packet radio format;
  iv. an information system for storing and retrieving information related to the position;
  v. a monitoring device coupled to the first communications circuit for monitoring the position; and
  vi. an alerting device coupled to the monitoring device for sending an alert to a location other than the position when the position is equal to an alert position; and
 b. a positioning system including:
  i. a second receiver for receiving GPS transmissions;
  ii. a determining circuit coupled to the second receiver for determining the position of the positioning system based on the GPS transmissions; and
  iii. a second communications circuit coupled to the determining circuit for communicating with the first communications circuit in the packet radio format and obtaining the differential corrections and information related to the position and for providing additional information to be added to the information system, wherein the second communications circuit also automatically and periodically provides the position to the reference station.

23. The system as claimed in claim 22 wherein the positioning system further includes an actual position determining circuit coupled to the determining circuit and to the second communications circuit for determining an actual position using the GPS transmissions and the differential corrections.

24. The system as claimed in claim 23 wherein the positioning system further includes an interface coupled to the second communications circuit for interfacing with a user and allowing the user to obtain information from the reference station and to provide the additional information to the reference station.

25. The system as claimed in claim 24 wherein the information system includes a data storage memory and retrieval system.

26. The system as claimed in claim 25 wherein the information system includes a direct internet connection allowing the user to have direct access to information on the internet.

27. The system as claimed in claim 26 wherein the packet radio format is a CDPD format.

28. A system for determining and monitoring a position of a positioning system comprising:
   a. a positioning system including:
      i. a first receiver for receiving GPS transmissions;
      ii. a determining circuit coupled to the first receiver for determining the position of the positioning system based on the GPS transmissions; and
      iii. a first communications circuit coupled to the determining circuit for automatically and periodically transmitting the position in a packet radio format; and
   b. a reference station including:
      i. a second receiver for receiving GPS transmissions;
      ii. a second communications circuit coupled to the first receiver for receiving the position from the first communications circuit;
      iii. a monitoring circuit for monitoring and tracking the position; and
      iv. an alerting device coupled to the monitoring circuit for sending an alert signal to a location other than the positioning system if the position of the positioning system is equal to a predetermined position.

29. A system for determining a position of a positioning system comprising:
   a. one or more reference stations including a first communications circuit for sending and receiving communications in a packet radio format and an information system including mapping and non-mapping information; and
   b. a plurality of positioning systems each including:
      i. a first receiver for receiving GPS transmissions;
      ii. a determining circuit coupled to the first receiver for determining a position of the positioning systems based on the GPS transmissions; and
      iii. a second communications circuit coupled to the determining circuit for communicating with the first communications circuit in the packet radio format to obtain information about the position from the information system and to provide additional information to be added to the information system;
   wherein at least one of the plurality of positioning systems is stationary at a given time and is used to generate differential corrections which are transmitted to the remaining positioning systems.

30. The system as claimed in claim 29 wherein the positioning system further includes an interface coupled to the second communications circuit for interfacing with a user and allowing the user to obtain information from the reference station and to provide information to the reference station.

31. The system as claimed in claim 1 wherein the means for communicating is further configured to obtain geographical mapping information related to the position.

32. The method as claimed in claim 17 wherein the step of communicating further includes obtaining geographical mapping information related to the position.

33. The system as claimed in claim 22 wherein the second communications circuit is configured to obtain geographical mapping information related to the position.

* * * * *